(12) United States Patent
Lafond et al.

(10) Patent No.: US 12,104,735 B2
(45) Date of Patent: Oct. 1, 2024

(54) COUPLING DEVICE

(71) Applicant: Danfoss Power Solutions II Technology A/S, Nordborg (DK)

(72) Inventors: Sebastian Lafond, Habere Lullin (FR); Atul Puranik, Dattanagar Pune (IN); Vijay Surve, Niwas Pune (IN)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 153 days.

(21) Appl. No.: 17/600,802

(22) PCT Filed: Mar. 24, 2020

(86) PCT No.: PCT/EP2020/058214
§ 371 (c)(1),
(2) Date: Oct. 1, 2021

(87) PCT Pub. No.: WO2020/200928
PCT Pub. Date: Oct. 8, 2020

(65) Prior Publication Data
US 2022/0196194 A1   Jun. 23, 2022

(30) Foreign Application Priority Data
Apr. 4, 2019   (IN) .............................. 201911013646
May 17, 2019   (GB) ..................................... 1906951

(51) Int. Cl.
*H01R 13/62*    (2006.01)
*F16L 37/18*    (2006.01)
(Continued)

(52) U.S. Cl.
CPC ............... *F16L 37/56* (2013.01); *F16L 37/18* (2013.01); *F16L 37/20* (2013.01); *H01R 13/518* (2013.01);
(Continued)

(58) Field of Classification Search
CPC ............ H01R 13/518; H01R 13/62944; H01R 13/631; F16L 37/20; F16L 37/18; F16L 37/56
(Continued)

(56) References Cited

U.S. PATENT DOCUMENTS 4,103,712 A * 8/1978 Fletcher .................. F16L 37/36
  137/637.05
4,152,038 A * 5/1979 Inouye ................... H01R 12/88
  439/153
(Continued)

FOREIGN PATENT DOCUMENTS

| CN | 2830854 Y | 10/2006 |
| CN | 206306793 U | 7/2017 |

(Continued)

OTHER PUBLICATIONS

International Search Report for PCT/EP2020/058214 Dated Jul. 6, 2020.
(Continued)

*Primary Examiner* — Abdullah A Riyami
*Assistant Examiner* — Vladimir Imas
(74) *Attorney, Agent, or Firm* — McCormick, Paulding & Huber PLLC

(57) ABSTRACT

The invention relates to a coupling device for simultaneously coupling and decoupling a number of coupling pairs, which coupling device includes:—a number of coupling pairs, each having a first coupling part and a second coupling part; —a first mounting frame on which the first coupling parts of the number of coupling pairs are arranged; —a second mounting frame arranged parallel to the first mounting frame, wherein the second coupling parts of the number of coupling pairs are arranged to the second mounting frame, and wherein the second mounting frame is movable towards (Continued)

to and away from the first mounting frame between a connected position, in which each first coupling part is connected with the corresponding second coupling part, and a disconnected position; —guiding mechanism arranged to the first mounting frame and the second mounting frame for guiding the movement between the connected and disconnected position; —at least one rack and pinion drive arranged between the first and second mounting frame, wherein the pinion is arranged on a shaft rotatable arranged in the first mounting frame and wherein the rack extends from the second mounting frame in the direction of movement of said second mounting frame into the first mounting frame along the pinion; wherein the shaft extends with at least one end out of the first mounting frame and wherein an operating lever is arranged on the shaft.

20 Claims, 5 Drawing Sheets

(51) Int. Cl.
*F16L 37/20* (2006.01)
*F16L 37/56* (2006.01)
*H01R 13/518* (2006.01)
*H01R 13/629* (2006.01)
*H01R 13/631* (2006.01)

(52) U.S. Cl.
CPC ..... *H01R 13/62944* (2013.01); *H01R 13/631* (2013.01)

(58) Field of Classification Search
USPC ....................................................... 439/157
See application file for complete search history.

(56) References Cited

U.S. PATENT DOCUMENTS

| | | | | |
|---|---|---|---|---|
| 4,394,039 | A | 7/1983 | Burquier | |
| 5,110,301 | A * | 5/1992 | Inoue | H01R 13/62944 439/157 |
| 5,162,002 | A * | 11/1992 | Regnier | H01R 12/721 439/157 |
| 5,316,347 | A * | 5/1994 | Arosio | E02F 3/3654 285/85 |
| 5,721,669 | A * | 2/1998 | Becker | G11B 33/124 |
| 5,829,994 | A * | 11/1998 | Oda | H01R 13/62933 439/372 |
| 6,036,510 | A * | 3/2000 | Ono | H01R 13/62922 439/153 |
| 6,644,991 | B2 * | 11/2003 | Martin | H01R 13/62944 439/372 |
| 7,258,369 | B2 * | 8/2007 | Martin | F16L 37/56 285/38 |
| 7,445,475 | B2 * | 11/2008 | Tajiri | H01R 13/62955 439/157 |
| 7,641,486 | B2 * | 1/2010 | Tonosaki | H01R 13/62938 439/372 |
| 7,670,159 | B2 * | 3/2010 | Shamoto | H01R 13/62938 439/372 |
| 8,007,298 | B2 * | 8/2011 | Komiyama | H01R 13/4361 439/157 |
| 8,197,270 | B2 * | 6/2012 | Vasbinder | H01R 13/62977 439/157 |
| 8,439,695 | B2 * | 5/2013 | Komiyama | H01R 13/62977 439/157 |
| 8,998,910 | B2 * | 4/2015 | Borja | A61B 17/157 606/88 |
| 10,276,977 | B2 * | 4/2019 | Lesniak | H01R 13/6295 |
| 11,025,005 | B1 * | 6/2021 | Shimizu | H01R 13/53 |
| 11,079,053 | B2 * | 8/2021 | Wolf | F16L 37/56 |
| 11,437,758 | B1 * | 9/2022 | Reedy | H01R 13/62955 |
| 2005/0285390 | A1 | 12/2005 | Martin | |
| 2016/0040696 | A1 | 2/2016 | Richiuso et al. | |
| 2016/0149342 | A1 | 5/2016 | Rodriguez | |
| 2016/0285200 | A1 * | 9/2016 | Eow | H01R 13/62955 |

FOREIGN PATENT DOCUMENTS

| | | |
|---|---|---|
| CN | 208665081 U | 3/2019 |
| DE | 8714016 U1 | 11/1987 |
| GB | 1 368 0 39 A | 9/1974 |
| JP | 51-151118 U | 12/1976 |
| SU | 1492164 A1 | 7/1989 |
| WO | 2013060772 A1 | 5/2013 |

OTHER PUBLICATIONS

Office Action for Chinese Patent Application No. 202080027493.1 dated Aug. 24, 2022 and its English translation.
Examination Report under Section 18(3) corresponding to Great Britain Patent Application No. 1906951.7 dated Sep. 28, 2022.

* cited by examiner

COUPLING DEVICE

CROSS-REFERENCE TO RELATED APPLICATION

This application is a National Stage application of International Patent Application No. PCT/EP2020/058214, filed on Mar. 24, 2020, which claims priority to Indian Application No. 201911013646 filed on Apr. 4, 2019, and Great Britain Application No. 1906951.7 filed on May 17, 2019, each of which is hereby incorporated by reference in its entirety.

TECHNICAL FIELD

The invention relates to a coupling device for simultaneously coupling and decoupling a number of coupling pairs, which coupling device comprises:
 a number of coupling pairs, each having a first coupling part and a second coupling part;
 a first mounting frame on which the first coupling parts of the number of coupling pairs are arranged;
 a second mounting frame arranged parallel to the first mounting frame, wherein the second coupling parts of the number of coupling pairs are arranged to the second mounting frame, and wherein the second mounting frame is moveable towards to and away from the first mounting frame between a connected position, in which each first coupling part is connected with the corresponding second coupling part, and a disconnected position.

BACKGROUND

Such coupling devices are typically known from electrical connectors, wherein a number of terminals are arranged in a first housing, which is inserted into a second housing with corresponding terminals in order to simultaneously connect a number of terminals.

If a large number of terminals is to be connected simultaneously, the required force to connect the terminals will be substantial.

If a number of hydraulic couplings, such as a quick connect shut-off couplings or quick disconnects (QDC's), are to be simultaneously connected, then the required force will even be more substantial to a level, wherein a person cannot manually generate the required force.

Especially with hydraulic couplings, it is further required that once the couplings are coupled, the hydraulic pressure does not force the couplings parts out of each other such that the couplings disconnects.

SUMMARY

It is an object of the invention to provide a coupling device in which the above-mentioned disadvantages are reduced or even removed.

This object is achieved according to the invention with a coupling device according to the preamble, which coupling device is characterized by at least one rack and pinion drive arranged between the first and second mounting frame, wherein the pinion is arranged on a shaft rotatable arranged in the first mounting frame and wherein the rack extends from the second mounting frame in the direction of movement of said second mounting frame into the first mounting frame along the pinion;
 wherein the shaft extends with at least one end out of the first mounting frame and wherein an operating lever is arranged on the shaft.

Using at least one rack and pinion drive allows for a controlled movement of the mounting frames towards the connected position and the generation of a high connecting force by the rotation of the pinion with the operating lever via the shaft. A further advantage of the use of the rack and pinion drive is that this drive can be embodied as self braking, such that hydraulic pressure on the coupling pairs cannot push the mounting frames away from each other.

Preferably, the pinion and shaft are integrally formed, i.e. as one piece. This avoids any play between the shaft and the pinion.

An embodiment of the coupling device according to the invention further comprises guiding means arranged to the first mounting frame and the second mounting frame for guiding the movement between the connected and disconnected position.

In a preferred embodiment of the coupling device according to the invention the guiding means comprise at least two guide pins extending from the second mounting frame and at least two corresponding guide holes arranged in the first mounting frame.

The at least two guide pins with corresponding guide holes ensure a defined guiding of the two mounting frames.

Preferably the guiding means are further embodied by the at least one rack and a hole arranged in the first mounting frame in which the corresponding pinion extends. By having the pinion extending into the hole, the at least one rack also can function as a guide. The hole further provides for an enclosure for the rack, such that the rack cannot bend away from the pinion and a large force can be transferred from the pinion onto the rack.

A further embodiment of the coupling device according to the invention further comprises blocking means comprising a hole or groove arranged in the rack and a locking pin movable perpendicular to the movement of the at least one rack between a locking position, in which the locking pin engages in the hole or groove, and an unlocked position.

The blocking means ensure that the rack is maintained in the position, wherein the coupling pairs are connected. The blocking means prevent in the locked position any movement of the rack and therefore any movement of both the mounting frames.

Preferably, the free end of the rack is wedge shaped and the wedge shape is directed towards the locking pin for urging the locking pin towards the unlocked position.

When the mounting frames are disconnected and are being moved towards each other, the wedge shaped end of the rack will urge the locking pin away, which allows the insertion of the rack into the first mounting frame. Only if the rack is fully inserted and the first and second mounting frame are in the connected position, the locking pinwill engage into the hole or groove of the rack.

In yet another embodiment of the coupling device according to invention the at least one pinion comprises a toothed sector and a non-toothed sector and wherein the corresponding rack comprises a toothed zone and a recess arranged adjacent to the toothed zone, wherein the recess is congruent to the non-toothed sector of the pinion.

The toothed sector of the pinion and the toothed zone of the rack enable the movement of the first and second mounting frames into the connected position. Further rotation of the pinion brings the non-toothed sector in engagement with the congruent recess of the rack providing a locking of the rack in the connected position.

Preferably, the coupling device further comprises blocking means comprising a hole or groove arranged in the shaft and a locking pin movable perpendicular to the shaft between a locking position, in which the locking pin engages in the hole or groove, and an unlocked position.

The locking pin can engage into the shaft, such that rotation of the pinion is no longer possible, which ensures that the first and second mounting frame remain in the connected position.

In yet another embodiment of the coupling device according to the invention a second end of the shaft extends out of the first mounting frame and a second operating lever is arranged on the second end of the shaft.

With this embodiment, the shaft can be rotated from both ends. If both operating levers are connected on the free ends with each other, an operator can provide a maximum force on the shaft.

In still a further embodiment of the coupling device according to the invention, the coupling pairs comprise hydraulic quick connect shut-off couplings and/or the coupling pairs comprise electrical connectors.

In yet another embodiment of the coupling device according the invention, the first and second mounting frames are substantially plate shaped.

BRIEF DESCRIPTION OF THE DRAWINGS

These and other features of the invention will be elucidated in conjunction with the accompanying drawings.

DETAILED DESCRIPTION

Figure 1:
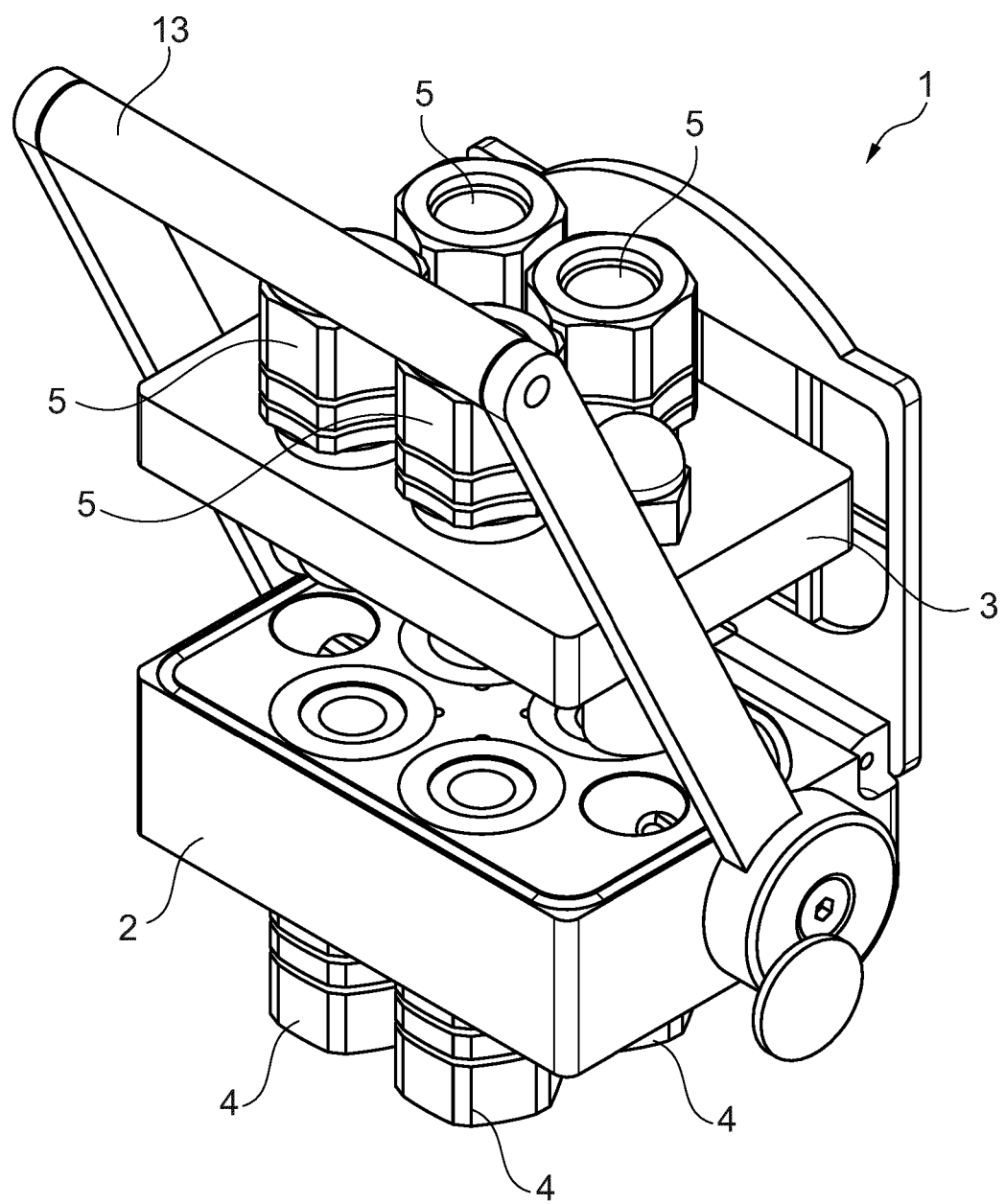
FIG. 1 shows a perspective view of a first embodiment of a coupling device according to the invention.

FIG. 1 shows a perspective view of a first embodiment of a coupling device 1 according to the invention.

The coupling device 1 has a first mounting frame 2 and a second mounting frame 3 arranged parallel to the first mounting frame 2.

A number of first coupling parts 4 of a hydraulic coupling pair, such as a quick disconnect coupling, are arranged in the first mounting frame 2. The corresponding second coupling parts 5 of the hydraulic coupling pair are arranged in the second mounting frame 2.

Figure 7:
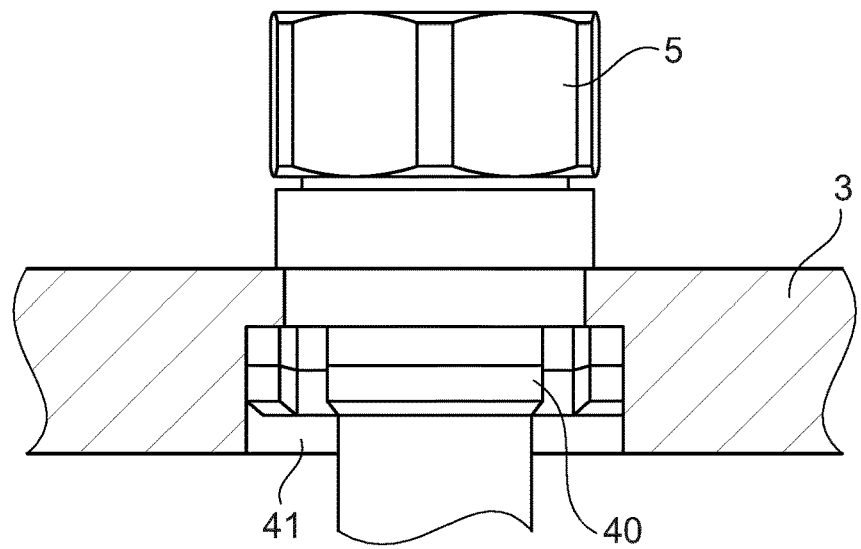
FIG. 7-10 show details of the embodiment shown in FIGS. 1-4.

As shown in detail in FIG. 7, the second hydraulic coupling parts 4 are mounted in the second mounting frame 3 and locked by a nut 40, which is accommodated in a recess 41 in the second mounting frame 3. With the nut 40, the second hydraulic coupling parts 4 can be removed for servicing.

Figure 10:
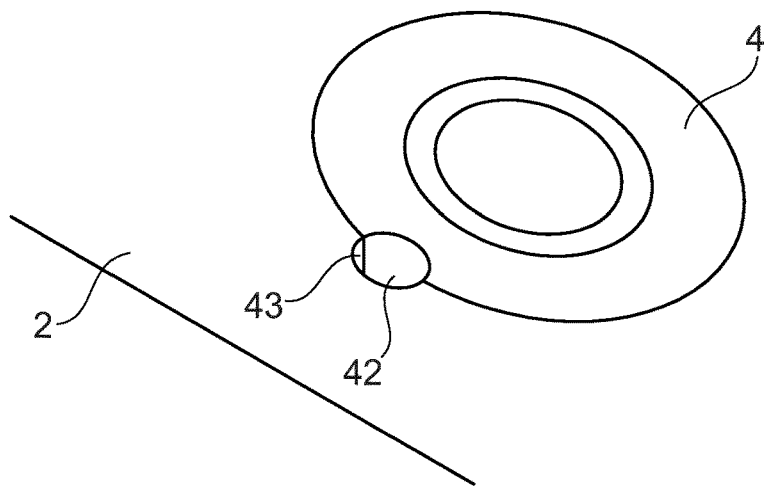

FIG. 10 shows a detail of the first coupling parts 4 arranged in the first mounting frame 2. The first coupling part 4 is provided with a semi circular slot 42, which corresponds with a semi circular slot 43 in the first mounting frame 2. By aligning both semi circular slots 42, 43 to a full circular slot, the first coupling part 4 can be locked for rotation during servicing by inserting a pin into the full circular slot 43, 43.

Figure 2:
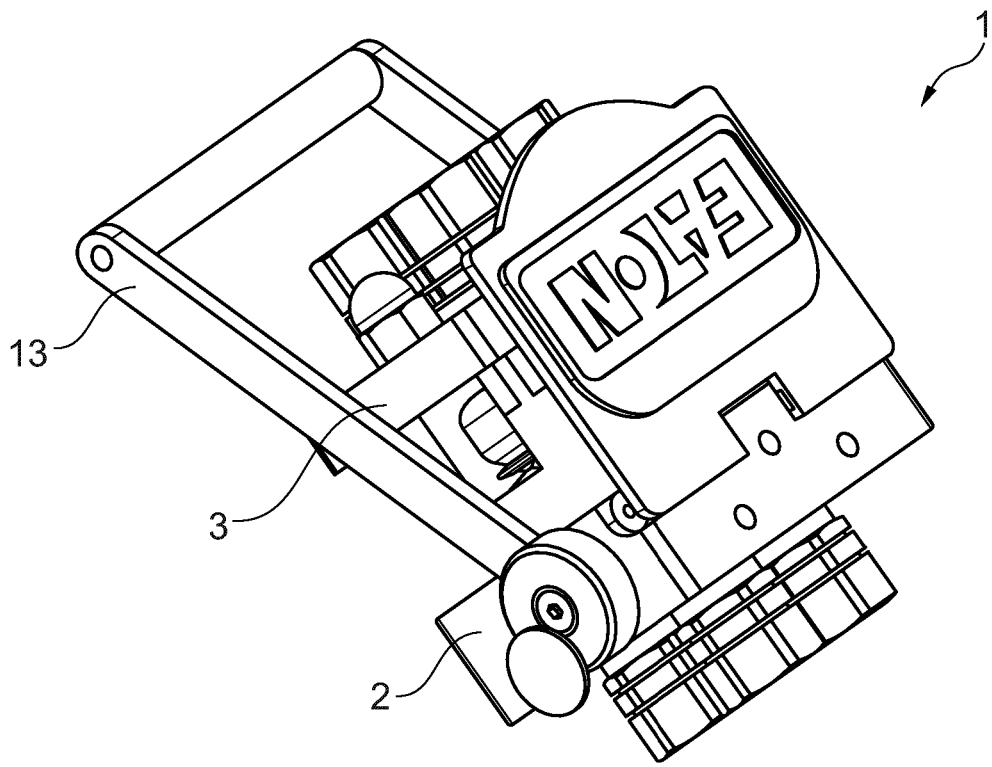
FIG. 2 shows a second perspective view of the coupling device according to FIG. 1.
Figure 3:
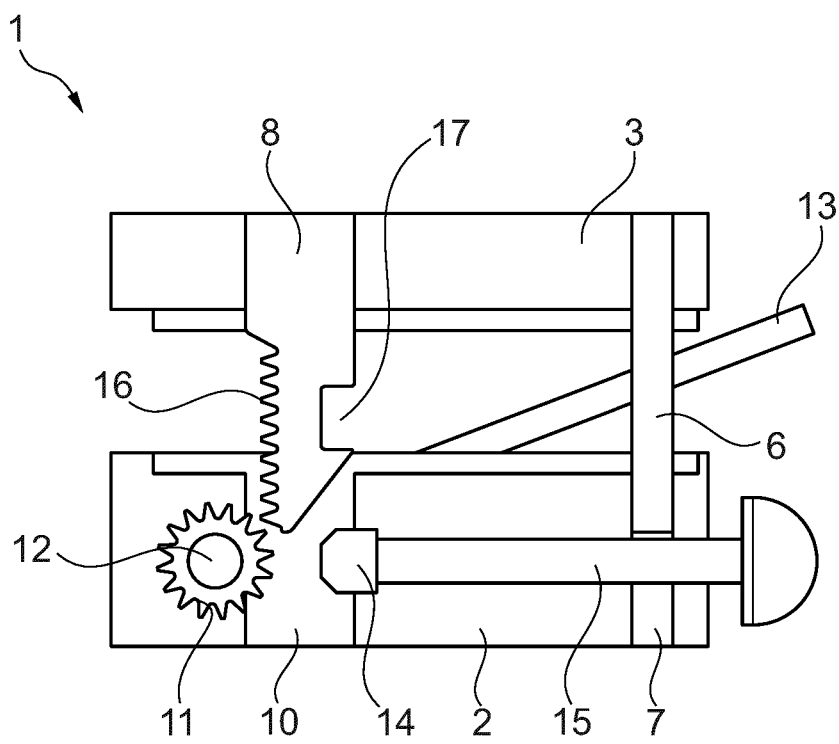
FIG. 3 shows a cross sectional view of the coupling device according to FIG. 1 in disconnected position.

As shown in FIGS. 2 and 3, the second mounting frame 3 is provided with guide pins 6, which are guided in guide holes 7.

Racks 8, 9 are arranged to the second mounting frame 3 and extend into holes 10 in the first mounting frame 2. A pinion 11 extends into the hole 10. This pinion 11 is arranged on a shaft 12, which is operated by a lever 13 arranged on both ends of the shaft 12.

Figure 8:
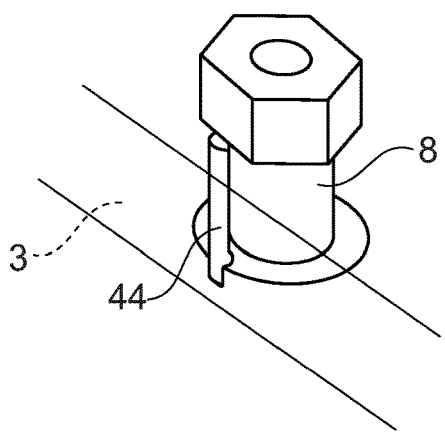

As show in FIG. 8, a pin slot 44 is provided to align the rack 8 with the second mounting frame 3. The pin slot 44 is a circular slot with a cylindrical pin arranged in said slot. Due to the overlap of this slot between the rack 8 and the second mounting frame 3, the alignment of the rack 8 is ensured.

Figure 9:
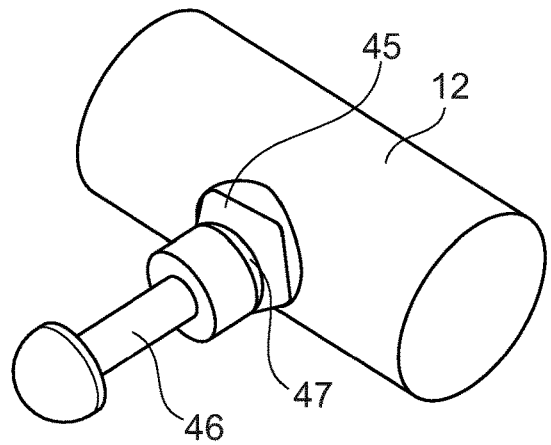

FIG. 9 shows a detail of the shaft 12. The shaft 12 is provided with an indent 45, in which a spring force urged pin 46 extends. Due to the spherical end 47 of the pin 46 and the suitably shaped indent 45, it is possible to move the shaft 12 out of the locked position by applying a small additional force. This spring force urged pin 46 thus provides for a recognizable position of the shaft, while providing the ability to freely rotate the shaft and the attached lever 13.

A locking pin 14 arranged on a control rod 15 is arranged perpendicular to the rack 8 in the first mounting frame 2. The rack 8 has a toothed portion 16, which cooperates with the pinion 11, and a hole or groove 17 in which the locking pin 14 can be seated.

Figure 4:
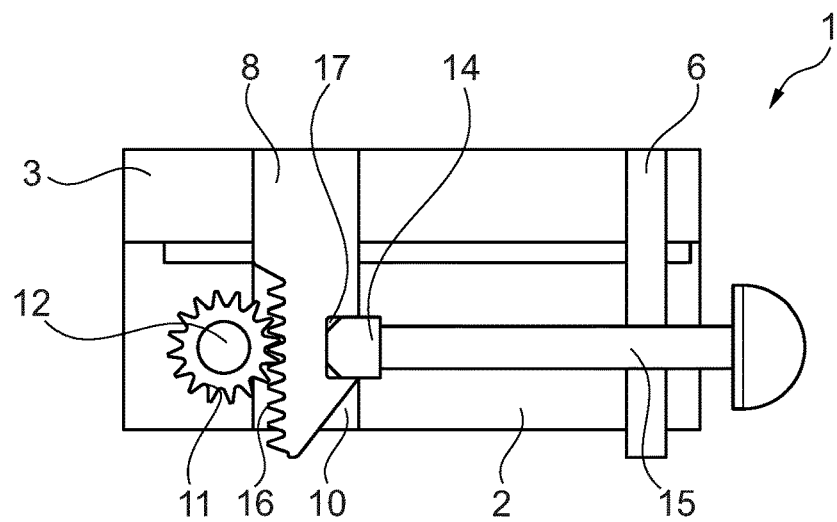
FIG. 4 shows a cross sectional view of the coupling device according to FIG. 1 in connected position.

FIG. 4 shows the coupling device 1 in the connected position, wherein the second mounting frame 3 is moved toward the first mounting frame 2 and is guided by the guide pins 6 and the rack 8 arranged in the hole 10. This movement is caused by the rotation of the shaft 12, which drives the pinion 11 and causes a translation of the rack 8 by the engagement of the toothed portion 16.

In this connected position of the first and second mounting frame 2, 3, the locking pin 14 is seated in the hole or groove 17 of the rack 8 to prevent unintentional movement of the first and second mounting frame 2, 3 towards the disconnected position. When it is desired to rotate the shaft 12, such that the second mounting frame 3 moves to the disconnected position, the locking pin 14 is pulled out of the hole or groove 17 by the control rod 15, after which the shaft 12 can be rotated and the first and second mounting frame 2, 3 can move to the disconnected position.

Figure 5:
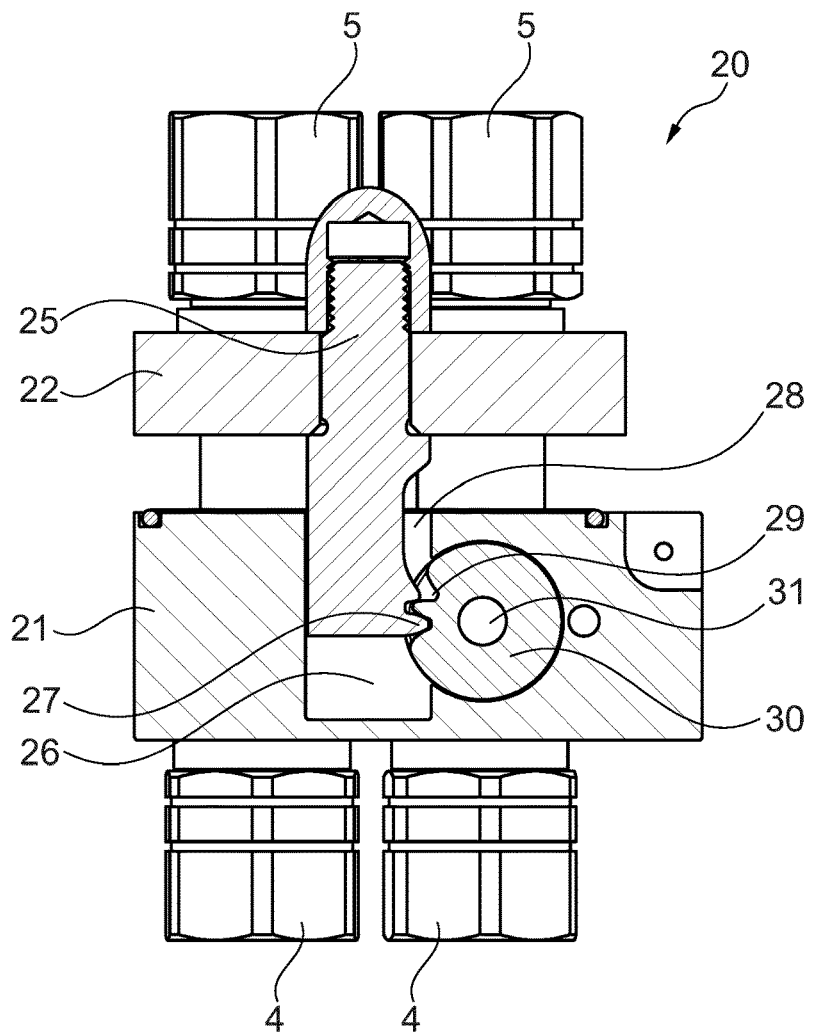
FIG. 5 shows a cross sectional view of a second embodiment according to the invention in disconnected position.

FIG. 5 shows a cross sectional view of a second embodiment of a coupling device 20 according to the invention. The coupling device 20 has a first mounting frame 21 and a second mounting frame 22. The first and second mounting frame 21, 22 are guided by the rack 25 and hole 26.

The rack 25 has a toothed zone 27 and a recess 28. The rack cooperates with the pinion 29, 30, which is arranged on a shaft 31 operable by a lever (not show). The pinion 29, 30 has a toothed sector 29 and a non-toothed sector 30.

Figure 6:
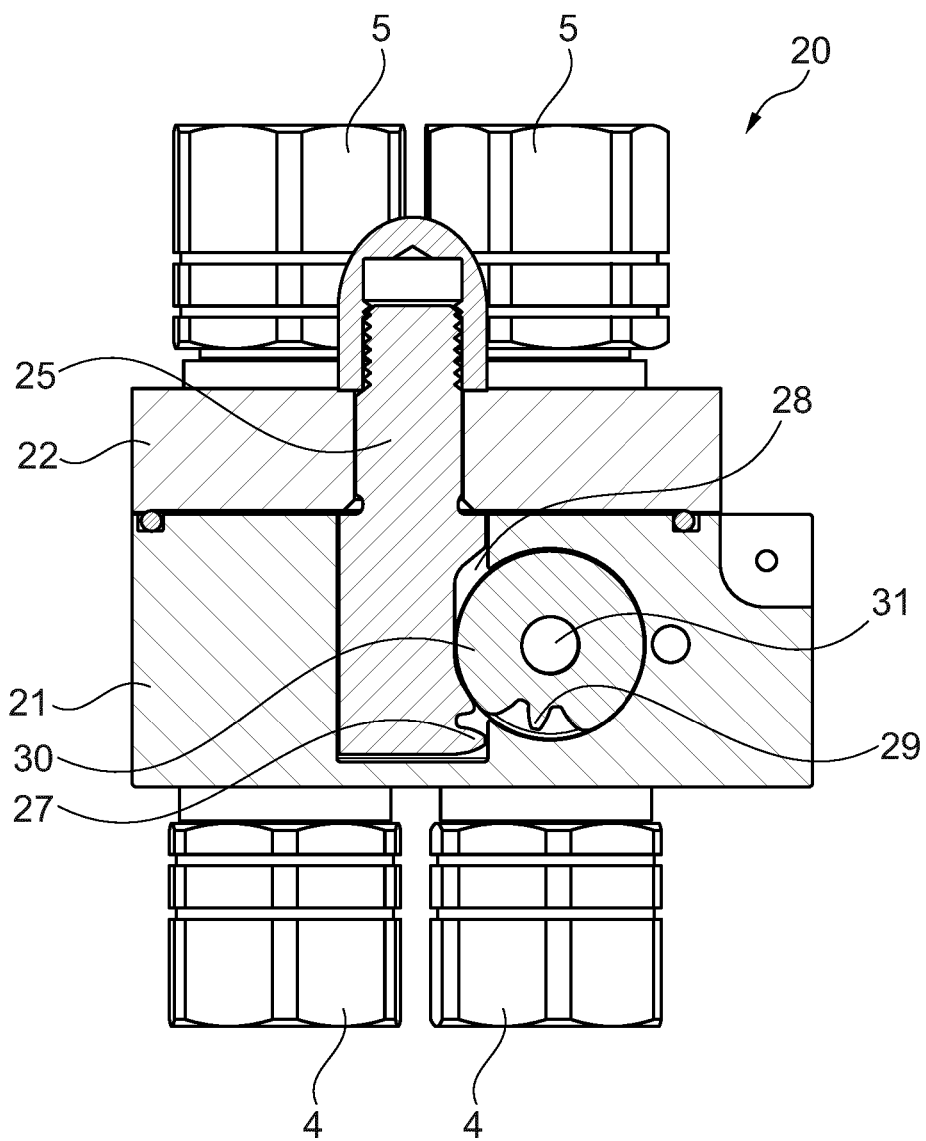
FIG. 6 shows a cross sectional view of the embodiment of FIG. 5 in connected position.

When the shaft 31 is rotated, the teeth of the toothed sector 29 will engage with the toothed zone 28 of the rack and will pull the second mounting frame 22 towards first mounting frame 21 and into a connected position (see FIG. 6.)

When the first and second mounting frame 21, 22 are in the connected position, the shaft 31 can be rotated further, such that the non-toothed sector 30 is accommodated into the recess 28 of the rack 25 and ensures that the rack 25 cannot move without intentional rotation of the shaft 31 and pinion 29, 30.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A coupling device for simultaneously coupling and decoupling a number of coupling pairs, which coupling device comprises:
   a number of coupling pairs, each having a first coupling part and a second coupling part;
   a first mounting frame on which the first coupling parts of the number of coupling pairs are arranged;
   a second mounting frame arranged parallel to the first mounting frame, wherein the second coupling parts of the number of coupling pairs are arranged to the second mounting frame, and wherein the second mounting frame is movable towards to and away from the first mounting frame between a connected position, in which each first coupling part is connected with the corresponding second coupling part, and a disconnected position;
   wherein at least one rack and pinion drive arranged between the first and second mounting frame, wherein the pinion is arranged on a shaft rotatable arranged in the first mounting frame and wherein the rack extends from the second mounting frame in the direction of movement of said second mounting frame into the first mounting frame along the pinion;
   wherein the shaft extends with at least one end out of the first mounting frame and wherein an operating lever is arranged on the shaft.

2. The coupling device according to claim 1, further comprising guiding means arranged to the first mounting frame and the second mounting frame for guiding the movement between the connected and disconnected position.

3. The coupling device according to claim 2, wherein the guiding means comprise at least one, preferably at least two guide pins extending from the second mounting frame and at least one, preferably at least two corresponding guide holes arranged in the first mounting frame.

4. The coupling device according to claim 3, wherein the guiding means are further embodied by the at least one rack and a hole through hole arranged in the first mounting frame in which the corresponding pinion extends.

5. The coupling device according to claim 1, further comprising blocking means comprising a hole or groove arranged in the rack and a locking pin movable perpendicular to the movement of the at least one rack between a locking position, in which the locking pin engages in the hole or groove, and an unlocked position.

6. The coupling device according to claim 5, wherein the free end of the rack is wedge shaped and wherein the wedge shape is directed towards the locking pin for urging the locking pin towards the unlocked position.

7. The coupling device according to claim 1, wherein the at least one pinion comprises a toothed sector and a non-toothed sector and wherein the corresponding rack comprises a toothed zone and a recess arranged adjacent to thetoothed zone, wherein the recess is congruent to the non-toothed sector of the pinion.

8. The coupling device according to claim 7, further comprising blocking means comprising a hole or groove arranged in the shaft and a locking pin movable perpendicular to the shaft between a locking position, in which the locking pin engages in the hole or groove, and an unlocked position.

9. The coupling device according to claim 1, wherein a second end of the shaft extends out of the first mounting frame and wherein a second operating lever is arranged on the second end of the shaft.

10. The coupling device according to claim 1, wherein the coupling pairs comprise hydraulic quick connect shut-off couplings and/or the coupling pairs comprise electrical connectors.

11. The coupling device according to claim 1, wherein the first and second mounting frames are substantially plate shaped.

12. The coupling device according to claim 2, further comprising blocking means comprising a hole or groove arranged in the rack and a locking pin movable perpendicular to the movement of the at least one rack between a locking position, in which the locking pin engages in the hole or groove, and an unlocked position.

13. The coupling device according to claim 3, further comprising blocking means comprising a hole or groove arranged in the rack and a locking pin movable perpendicular to the movement of the at least one rack between a locking position, in which the locking pin engages in the hole or groove, and an unlocked position.

14. The coupling device according to claim 4, further comprising blocking means comprising a hole or groove arranged in the rack and a locking pin movable perpendicular to the movement of the at least one rack between a locking position, in which the locking pin engages in the hole or groove, and an unlocked position.

15. The coupling device according to claim 2, wherein the at least one pinion comprises a toothed sector and a non-toothed sector and wherein the corresponding rack comprises a toothed zone and a recess arranged adjacent to the toothed zone, wherein the recess is congruent to the non-toothed sector of the pinion.

16. The coupling device according to claim 3, wherein the at least one pinion comprises a toothed sector and a non-toothed sector and wherein the corresponding rack comprises a toothed zone and a recess arranged adjacent to the toothed zone, wherein the recess is congruent to the non-toothed sector of the pinion.

17. The coupling device according to claim 4, wherein the at least one pinion comprises a toothed sector and a non-toothed sector and wherein the corresponding rack comprises a toothed zone and a recess arranged adjacent to the toothed zone, wherein the recess is congruent to the non-toothed sector of the pinion.

18. The coupling device according to claim 2, wherein a second end of the shaft extends out of the first mounting frame and wherein a second operating lever is arranged on the second end of the shaft.

19. The coupling device according to claim 3, wherein a second end of the shaft extends out of the first mounting frame and wherein a second operating lever is arranged on the second end of the shaft.

20. The coupling device according to claim 4, wherein a second end of the shaft extends out of the first mounting frame and wherein a second operating lever is arranged on the second end of the shaft.

* * * * *